US008788513B2

(12) United States Patent
Tewksbary et al.

(10) Patent No.: US 8,788,513 B2
(45) Date of Patent: Jul. 22, 2014

(54) COMPUTER METHOD AND SYSTEM PROVIDING ACCESS TO DATA OF A TARGET SYSTEM

(75) Inventors: David Edward Tewksbary, Bolton, MA (US); Anup Chandran, Reading (GB); Boris Tabenkin, Georgetown, MA (US)

(73) Assignee: Dassault Systemes Americas Corp., Waltham, MA (US)

( * ) Notice: Subject to any disclaimer, the term of this patent is extended or adjusted under 35 U.S.C. 154(b) by 722 days.

(21) Appl. No.: 12/610,096

(22) Filed: Oct. 30, 2009

(65) Prior Publication Data

US 2011/0106803 A1     May 5, 2011

(51) Int. Cl.
   *G06F 17/30*     (2006.01)
   *H04L 29/06*     (2006.01)
   *G06F 9/50*     (2006.01)

(52) U.S. Cl.
    CPC .............. *G06F 9/5038* (2013.01); *H04L 67/40* (2013.01)
    USPC .......................................... 707/758; 707/759

(58) Field of Classification Search
    CPC ............. G06F 17/30436; G06F 17/30427; G06F 17/30477; G06F 17/30867; G06F 17/30017; G06F 17/30672; G06F 17/3089; G06F 17/30058; G06F 17/30286; G06F 17/30905
    USPC .......................................... 707/737, 759, 758
See application file for complete search history.

(56) References Cited

U.S. PATENT DOCUMENTS

| 6,934,709 B2 | 8/2005 | Tewksbary | |
| 2002/0116453 A1 | 8/2002 | Todorov et al. | |
| 2004/0207659 A1* | 10/2004 | Goodman et al. | 345/762 |
| 2005/0278692 A1* | 12/2005 | Sridhar et al. | 717/106 |
| 2008/0195483 A1 | 8/2008 | Moore | |
| 2008/0201300 A1* | 8/2008 | Goodwin et al. | 707/3 |
| 2009/0177957 A1 | 7/2009 | Bouillet et al. | |
| 2010/0332499 A1* | 12/2010 | Pan et al. | 707/759 |

FOREIGN PATENT DOCUMENTS

| EP | 0 908 816 A2 | 4/1999 |
| WO | WO 2005/114454 A2 | 12/2005 |
| WO | WO 2005/114454 A3 | 12/2005 |

OTHER PUBLICATIONS

Hai He et al., Automatic integration of Web search interfaces with WISE-Integrator Edited by M. Carey. Received: Jan. 2, 2004 / Accepted: Mar. 23, 2004 Publised online: Aug. 12, 2004 (VLDB Journal (2004) 13: 256-273.*

IBM United States Software Announcement 208-430 "V6 Momentum Continues with V6R2009x and substantiates PLM 2.0," 30 pages, dated Nov. 25, 2008.

European Search Report, European Application No. EP 10188431, Date of Search Jul. 4, 2011, 8 pages.

* cited by examiner

*Primary Examiner* — Apu Mofiz
*Assistant Examiner* — Fariborz Khoshnoodi
(74) *Attorney, Agent, or Firm* — Hamilton, Brook, Smith & Reynolds, P.C.

(57) ABSTRACT

A computer system and method provides access to Web (global computer network) services data of a target system. The target system exposes data through multiple web services. An application interface is adapted to interface with the target system re-using existing (predefined) web services among applications for the target system. The application interface queries the exposed data. A mapping member maps between application interface query of exposed data and syntax of objects useable in a subject application. The mapping member enables the subject application to access data of object instances generated in response to the query.

8 Claims, 9 Drawing Sheets

COMPUTER METHOD AND SYSTEM PROVIDING ACCESS TO DATA OF A TARGET SYSTEM

BACKGROUND OF THE INVENTION

Global computer networks, such as the Internet, have provided new computing platforms and applications (including, software application design). For example, internet scale distributed computing provides so-called network as platform computing. The network as platform allows applications (configured as web-enabled applications), to be run entirely through a browser. Further, the network as platform allows users across or within various roles to collaborate.

With respect to a given web-enabled application, a user/client (a distributed object architecture client) executes the application through a respective browser. The browser is in communication with an application server (the distributed object server). Additionally, the browser is in communication with a web server. Many services, such as authentication services, transaction services, naming services, administration services and security services are duplicated on both the application server and the web server. Each user/client is typically separately registered with the platform. And each user/client is responsible for implementing a respective set of Web server services.

To date there is no mechanism for a user at a client of the platform to copy data and relationships to other data, or leverage off existing web server services across multiple applications.

An industry example of computer implemented programs and collaborative systems using network as platform is Product Lifecycle Management (PLM) Systems. PLM solutions refer to a business strategy that helps companies to share product data, apply common processes, and leverage corporate knowledge for the development of products from conception to the end of their life, across the concept of extended enterprise. According to this concept, a company is made up not just of its company departments but also of other actors such as business partners, suppliers, Original Equipment Manufacturers (OEM), and customers. By including these actors, PLM may allow this network to operate as a single entity to conceptualize, design, build, and support products and processes.

Amongst the PLM solutions are the computer-aided techniques, which are known to include Computer-Aided Design (CAD). Computer-Aided Design relates to software solutions for authoring product design. Similarly, CAE is an acronym for Computer-Aided Engineering, e.g. it relates to software solutions for simulating the physical behavior of a future product. CAM stands for Computer-Aided Manufacturing and typically includes software solutions for defining manufacturing processes and operations. Some PLM solutions make it possible, for instance, to design and develop products by creating digital mockups (a 3D graphical model of a product). The digital product may be first defined and simulated using an appropriate application. Then, the lean digital manufacturing processes may be defined and modeled.

For example, generally, the PLM solutions provided by Dassault Systèmes (under the trademarks CATIA, ENOVIA and DELMIA) provides an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Such PLM solutions comprise a relational database of products. The database comprises a set of textual data and relations between the data. Data typically include technical data related to the products said data being ordered in a hierarchy of data and are indexed to be searchable. The data are representative of the modeled objects, which are often modeled products and processes.

PLM information, including product configuration, process knowledge and resources information are typically intended to be edited in a collaborative way. For instance, a team of designers working in a collaborative way may individually contribute to design a product by accessing shared information related to the product from remote sites through web-enabled applications. Each user or remote site is separately registered with the system platform and each is responsible for implementing a respective set of web-server services for the application(s) of this project. Although a user may have existing web services originally implemented for other applications, there is no mechanism to reuse or share these web services for the current project. There is a need for users at a client or applications of the platform to copy or otherwise leverage off existing web services.

SUMMARY OF THE INVENTION

The present invention addresses the foregoing shortcomings of the prior art. In particular, the present invention provides a computer method, system and apparatus that enables reuse or common use of Web (global computer network servers) services of a client system across two or more applications.

In a preferred embodiment, the invention system includes an application interface and a mapping member. The application interface interfaces with a target (client) system that is exposing data through multiple web services. The application interface queries the exposed data. The application interface uses in common at least one of the multiple web services across two or more applications, such that the application interface reuses existing (previously provided) web services among applications for the target system.

To accomplish this reuse, the application interface chains calls to at least two of the web services of the target system in a manner resulting in a combined view of web services data from the target system. The at least two web services are previously provided by the target system.

The mapping member maps between (a) application interface query of the data exposed through the global computer network services and (b) syntax of objects useable in a subject application. The mapping member enables the subject application to access data of object instances generated in response to the query as implemented by the application interface.

In some embodiments, the target system is an external or foreign system to a collaborative or similar platform and is configured as a distributed object architecture client. The subject application is implemented as any of a computer system as wherein the subject application is implemented as any of an extensible markup language (XML) client, remote method invocation (RMI) client, enterprise JAVA Bean (EJB) client and a JAVA Native Interface (JNI) client.

In one embodiment, the present invention enhances a collaboration platform's ability to integrate with external systems (target clients). Specifically, an interface for extending a storage layer of the platform benefits from this invention since embodiments enable the platform to share data with external systems that offer web services that provide query data. The present invention provides the ability to describe the sequence of web service calls (multiple queries) in a declarative manner. The invention's implementation executes the sequence of Web services calls to produce an integrated view of the data. This facilitates a simplified way of describing the foreign data and allows an easy way of mapping this foreign data into a PLM (Product Lifecycle Management) data model. The PLM data model is natively consumed by platform applications (such as PLM, CV5, etc).

Therefore the present invention defines a unique query/ mapping syntax that looks at the "consolidated view" based on the relationships/dependencies and utilizes existing Web services to federate external data. The present invention solves the issue of federating data from external systems without writing any additional "code", thereby saving time and cost. The present invention also opens up opportunities for the collaboration platform to host various applications that require data federation. Toward that end, the present invention addresses the following problems:

1. Wasted time looking for product material across multiple systems
2. Complex integrations to keep separate enterprise systems synchronized
3. Ineffective collaboration between users working on separate systems
4. Difficulty retiring legacy systems due to complexity in data migration
5. Duplication of work by re-entering data into other systems
6. Ineffective data sharing with external suppliers using manual user interventions Accordingly, embodiments of the present invention provide an infrastructure level solution and define a unique query syntax that must be defined by any consumer intending to use this infrastructure.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1A:
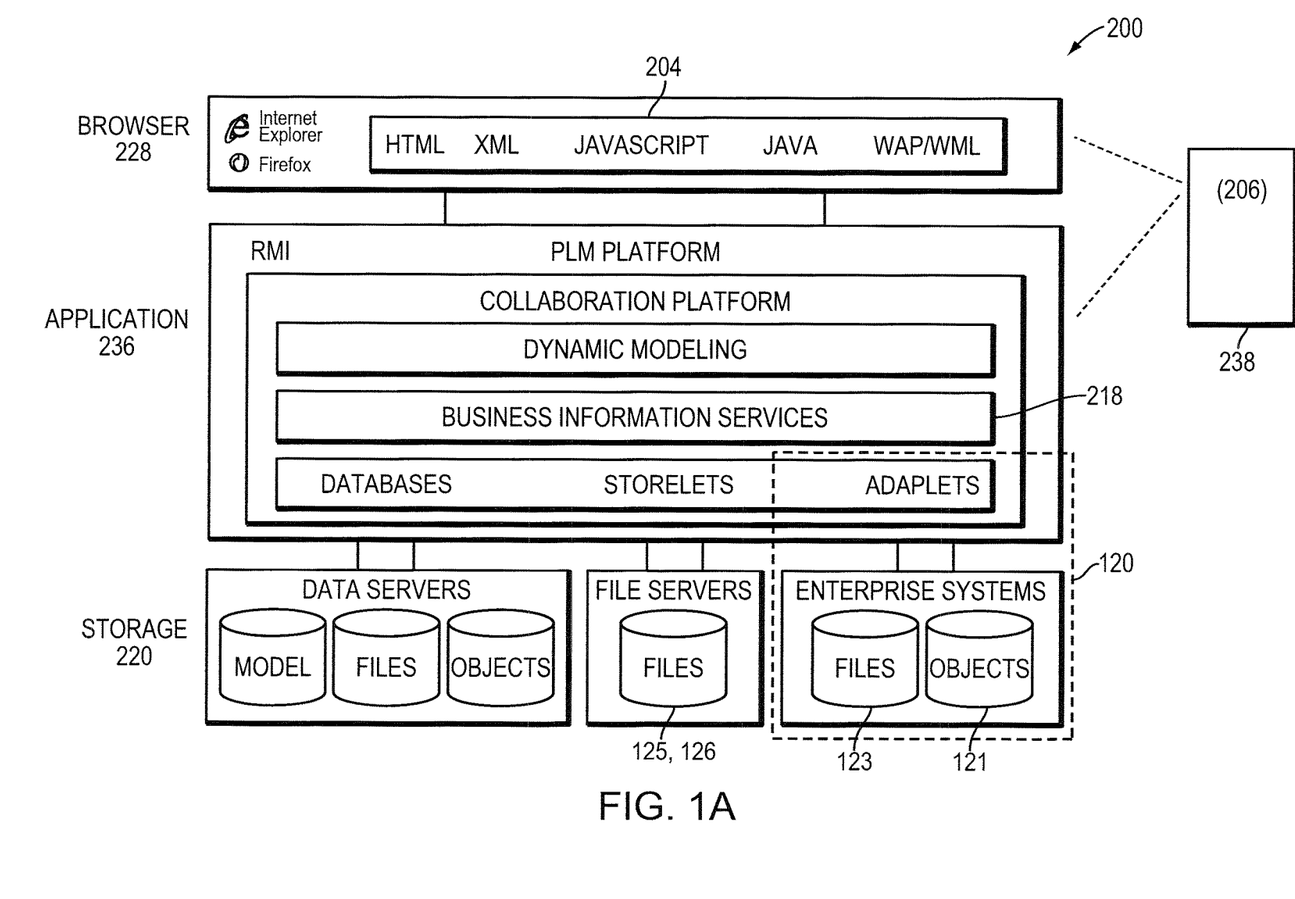
FIGS. 1A-1C are schematic and block diagrams of a Collaboration Platform in which embodiments of the present invention are deployed.
Figure 1B:
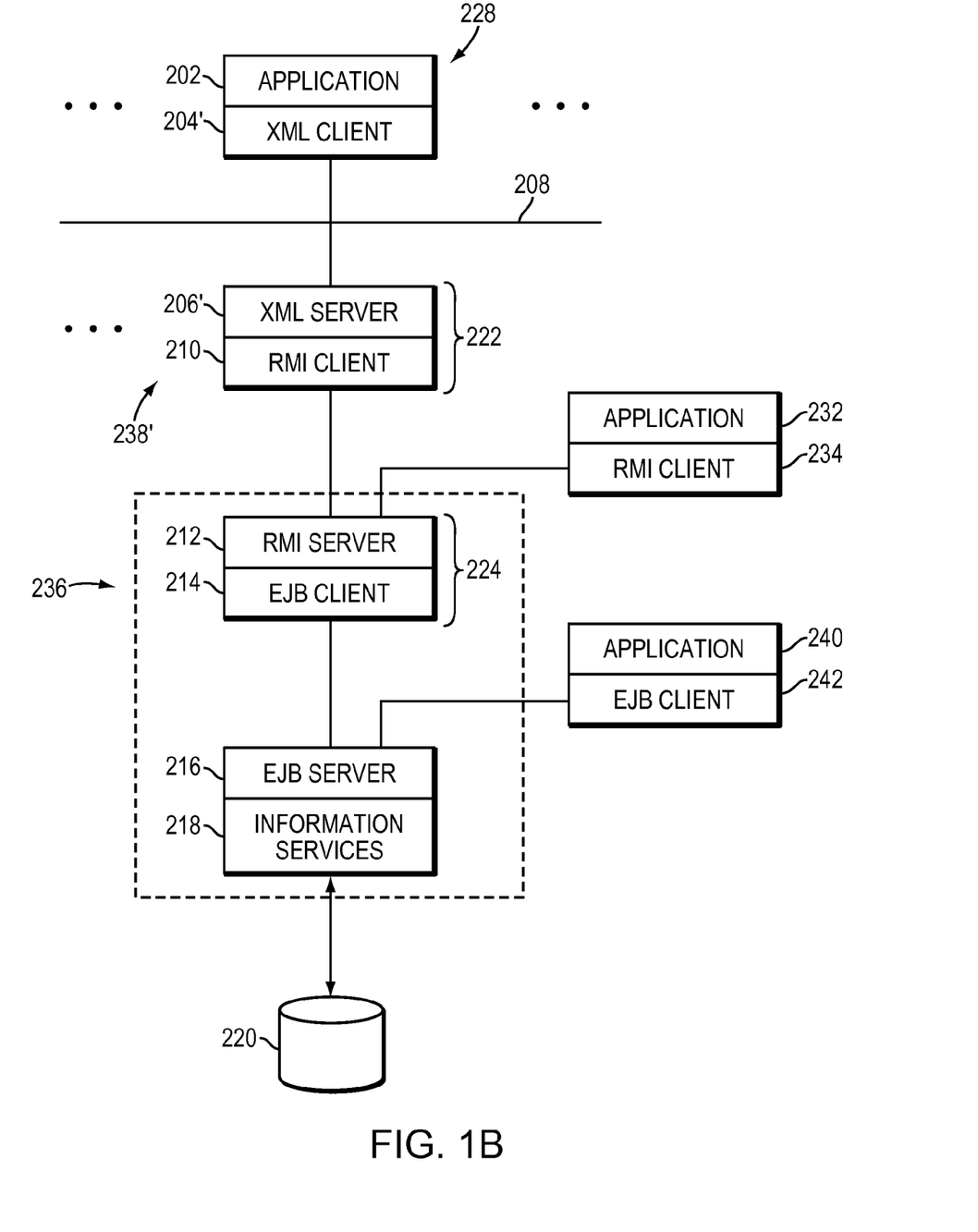

Illustrated in FIGS. 1A and 1B is a Collaboration Platform 200 employing an embodiment of the present invention. Collaboration Platform 200 is configured as a distributed object architecture. A preferred embodiment of Collaboration Platform 200 involves various web browsers 228 (a single one shown in FIG. 1B for simplicity), web servers 238 (one shown for clarity), an Application server 236 and a storage layer 220 (including application server databases, corresponding data servers and file servers). Through a web browser 228, an application 202 (implemented as an Extensible Marking Language (XML) client 204') is executed. The web browser 228 is in communication (through firewall 208) with an XML server 206' that resides on web server 238'. The web server 238' also includes a Remote Method Invocation (RMI) client 210 and an XML-RMI interface 222.

Similarly, this and other applications 202 can be implemented as RMI clients, EJB (EnterpriseJava Bean) clients, JNI (Java Native Interface) clients, and as clients on other web server architectures. These clients are generally referenced at 204 in FIG. 1A. Corresponding servers 206 (as generally referenced) reside on respective web servers 238 (generally referenced in FIG. 1A) configured similarly to that of web server 238' (i.e., with respective pertinent client 210 and interface 222).

As further shown in FIG. 1B, the application server 236 includes an RMI server 212, an EJB client 214, information services 218 (persistence, messaging, lifecycle, work flow, policy manager, administration, and structure management) which reside on an EJB server 216, and an RMI-EJB interface 224. The web server 238' communicates with the application server 236 through the XML-RMI interface 222 that resides on the Web server 238'. The web server 238' further communicates with the information serves 218 which resides on the EJB server 216 through the RMI-EJB interface 224. Thus, using the above described configuration, a user, using the application 202 can access the information services 218 on the EJB server 216 from XML client 204' through the Web server 238'. The services (authentication, security, transactions, naming, and database administration), which are duplicated in a CORBA-based architecture are provided by the web server 238' and shared with application server 236. This configuration is referred to as "web-centric" and the application 202 is N-Tier (as opposed to a 3-tier CORBA-based, web-enabled application, for example). The application 202 is deployed on the Web and can fully leverage the services and administration capabilities of web server 238' or application server 236.

The information services 218 can be accessed from any point in the network. For example, a user implementing an application 232 on an RMI client 234 from inside the firewall 208 can access the information services 218 on the EJB server 216 from the RMI server 212 through the RMI-EJB interface 224. Likewise a user implementing an application 240 on an EJB client 242 from inside the firewall 108 can access the information services 218 on the EJB server 216 directly from the EJB server 216. The applications 202', 232, and 240 are the same application implemented on different servers.

Thus, Platform 200 is not limited to typical web-enabled, 3-tier applications (as with CORBA-based architecture) but has N-tier applications due to a system complier described in U.S. Pat. No. 6,934,709, by assignee, herein incorporated by reference in its entirety. Any combination and any number of interfaces (N-tiers) may be stacked on top of one another when building web server 238 and the application server 236.

In a preferred embodiment, Collaboration Platform 200 provides a flexible PLM (Product Lifecycle Management) environment for supporting global, enterprise-wide deployments. Preferably the Collaboration Platform 200 is a single open environment/platform for various non-native and native applications 202, 232, 242 which enable the access and management of all product related information and knowledge from idea to product experience. The Platform 200 spans many if not all engineering disciplines and all PLM enterprise business processes.

The Collaboration Platform 200 provides the flexibility to easily configure business processes, user interfaces and infrastructure options to ensure that they meet an organization's needs, today and tomorrow, at the lowest possible total cost of ownership. To that end, one of the infrastructure services of Platform 200 is an application adapting interface called Adaplets 120 shown in FIG. 1A. Adaplets 120 enable application server 236 to communicate with data sources not native to Platform 200 and to represent this data as if it is native to Collaboration Platform 200.

The present invention enhances the Adaplets 120 infrastructure of the Platform 200 as explained next with reference to FIG. 1C-FIG. 5.

Adaplet APIs allow extension of Storage Management Layer 220 (FIG. 1A) of the Collaboration Platform 200 by "adapting" business entities/objects from foreign (external) or non-native systems 300 (e.g., CRM (Customer Relationship Management), ERP (Enterprise Resource Planning) or any other Enterprise Application). A concrete implementation (instance) of the Adaplet interface/API is known as an Adaplet 120 and gathers Business Objects/entities 121 and their relationships, which can be leveraged by the Collaboration Platform 200 (Modeling Query Language-MQL and Application Development Kit-ADK layers).

Each Adaplet 120 is specific to a Target (external) System 300 and appears as a separate Vault 125 (FIG. 1A) that Platform native applications 202, 232, 240 can leverage. Queries issued to an Adaplet Vault 125 return Business Objects 121 and Relationships in a manner indistinguishable from non-Adaplet Vaults 126.

Adaplets 120 enable real-time inter-operation between the Platform 200 and other systems 300 providing integrated information from multiple sources while causing no disruption of the other systems 300 and little burden to IT. With Adaplets 120 employed, Platform users have access to the information stored in other systems 300 as if it were actually part of the Platform 200. The externally-stored information is made indistinguishable from native Platform data. Operations that can be performed on native Platform information can also be performed on external information from Target Systems 300.

The Adaplets 120 have similar capabilities to each other:

(a) They are bidirectional with integrated transaction management. The Target system 300 may implement two-phase commit, or be treated as a one-phase data source.

(b) They expose both Business objects 121 and connections between Business Objects 121 in the Adapted/Foreign system 300.

(c) They have the ability to extend schema and build composite objects 121. Some object 121 attributes may reside in the Collaboration Platform 200, others in the Adapted/Foreign system 300. The combined object 121 appears through the Collaboration Platform 200 as a single object.

(d) They have the ability to connect objects in different federations. The Platform 200 relationships may be used to connect a native business object to an object 121 in an Adapted/Foreign vault 125, or to connect objects 121 in different Adapted/Foreign vaults 125.

Prior to the present invention, an Adaplet interface could be configured using two different architectures as follows. One option was based on a direct database connection to an external data source. Adaplets could also be implemented using Web Services APIs 150 and hereinafter referred to as WSA (Web Service Adaplets).

Figure 1C:
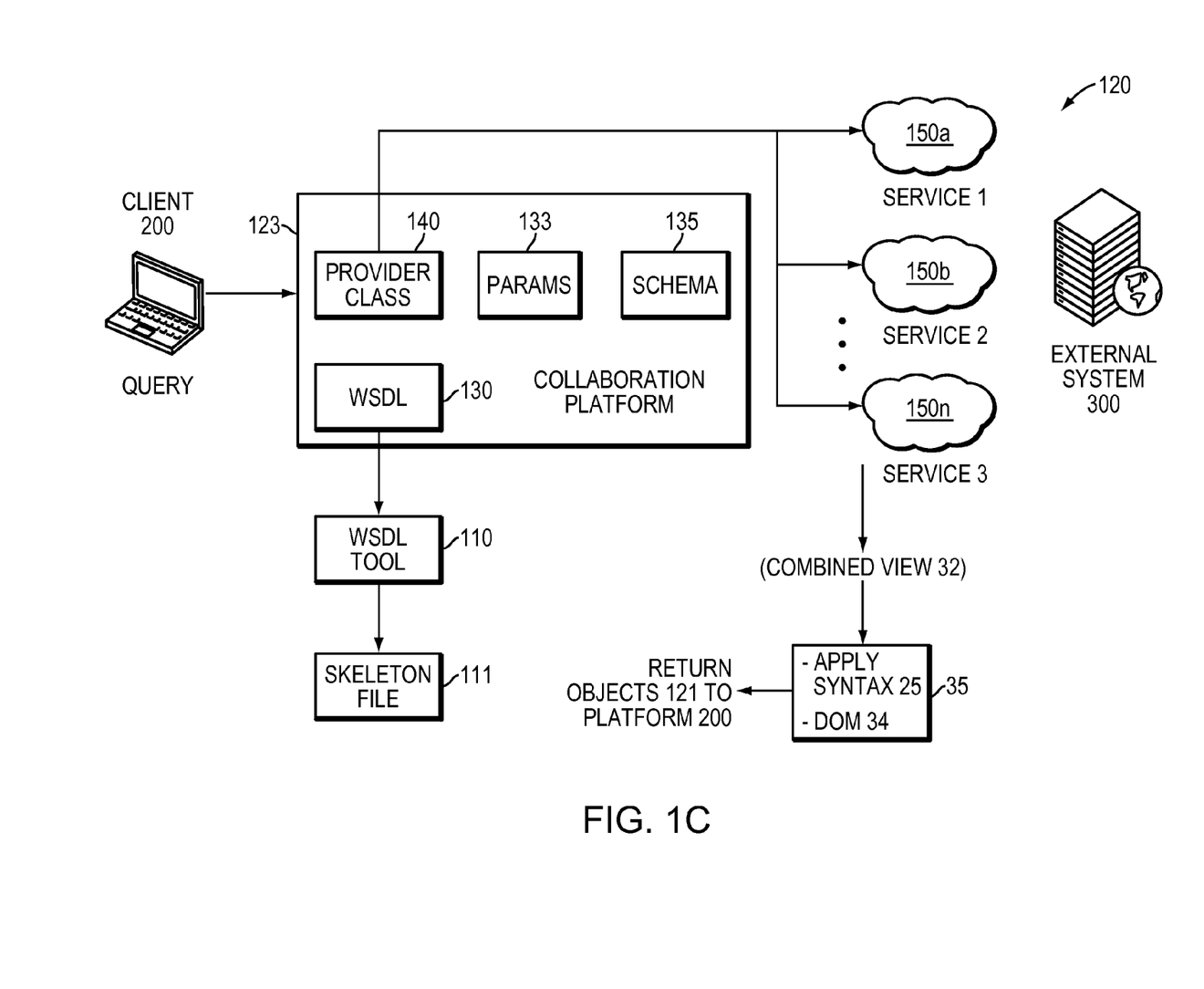

In one embodiment, a Web Services Adaplet is a Java Adaplet that talks to the foreign/external database (of Target System 300) through a web service 150. The Collaboration Platform 200 provides the Client Side of the web service 150. The handshake between the Platform Client 200 and the Adapted System 300 is defined by a WSDL file 130 that the Platform 200 provides. The WSDL file 130 describes the messages that the web service 150 understands, the format of the responses to those messages, the protocols that the service 150 supports, etc.

Customers can use this WSDL file 130 along with appropriate Java or C-Sharp tools 110 to generate stubs and skeleton files 111. The stubs and skeleton files 111 are used at runtime to make the web service 150 work.

One of the files 111 created by the WSDL tool 110 is the skeleton whose public functions must be filled in with code that provides answers to calls made by the client Platform 200. Most of the functions in this skeleton 111 get or set data from the Adapted System 300. A few others are involved in transaction control.

Objects/Relationships 121 returned by WSA Adaplets must conform to the structure Objects/Relationships within the Platform 200, both at a physical and logical level. The response data from the Target System 300 is mapped by an integrated mapping engine to Business Objects/Relationships 121 in Platform 200. Toward that end, the WSA Adaplet (via the integrated mapping engine) uses a Schema file 135 that describes "Types", "Attributes", "Relationships" etc. that the Adapted System 300 wants to expose.

To extract Business Objects/Data 121 from the external Systems 300, WSA Adaplets have to be configured and each Target System 300 must implement specific respective web services 150 that conform to the interface exposed by the Adaplet API (i.e., implement the operations/methods defined in the WSDL 130 and coded in skeleton file 111). In practice, this means that the integration effectively needs a middle layer (Target System 300 specific WSA Adaplets) to be created in order to bridge the Collaboration Platform 200 to the foreign/external system 300. This makes integration more complicated and costly.

Further, the WSA (Web Service Adaplet) can not leverage existing web services 150 in the foreign systems 300 to federate external data, as these web services 150 are not conforming to an interface defined by WSA Adaplet.

Lastly, as a limitation of these Web Service Adaplets, they do not consider the relationships or navigability of federated data while extracting the data.

The present invention enhances and improves on adaplet infrastructure. The approach taken by the present invention is radically different than that described above and looks at the relationship of federated data and their navigability while defining the Query syntax. The present invention uses a chaining of Web service calls to form a composite "Document Object Model" from which objects 121 are generated as further explained below.

Accordingly, the present invention makes the prior WSA (Web Service Adaplets) easier to use. Applicant's believe that the present invention greatly increases the adoption of the WSA technology. Also, the embodiments of the invention enable Collaboration Platform 200 to become a central repository for nontraditional data, such as non structured data (patient records, etc).

Some of the advantages of the present invention to the Collaboration Platform 200 are:

(1) Provides ability to exchange data and automate processes across the enterprise and even across business partners;

(2) Encourages global business collaboration by enabling users to work with information from multiple systems. This holistic view of information will enable better decision support systems, translating in low costs and faster product development cycles.

(3) Provides the gradual merging and migration of data from other databases;

(4) Enables the display of product information residing on different systems as if it was stored in the Platform databases/storage layer 220; and (5) Reduces development efforts and complex coding when linking to multiple data sources.

In comparison to the prior Web Services Adaplets, a major advantage of the present invention is re-use of existing software assets (existing web services 150) at the foreign or Target System 300. The present invention also does not require any additional "coding" to federate data from external systems 300.

Turning to FIGS. 1C-4, an embodiment of the present invention is detailed and described next. The invention Adaplet 120 architecture and implementation allows consumption of existing web-services 150 on Target System 300. In addition to this enhancement, the present invention defines a "unique" Query/Mapping syntax 25 that can identify any node of any document/Service (response) from a single root.

Figure 2:
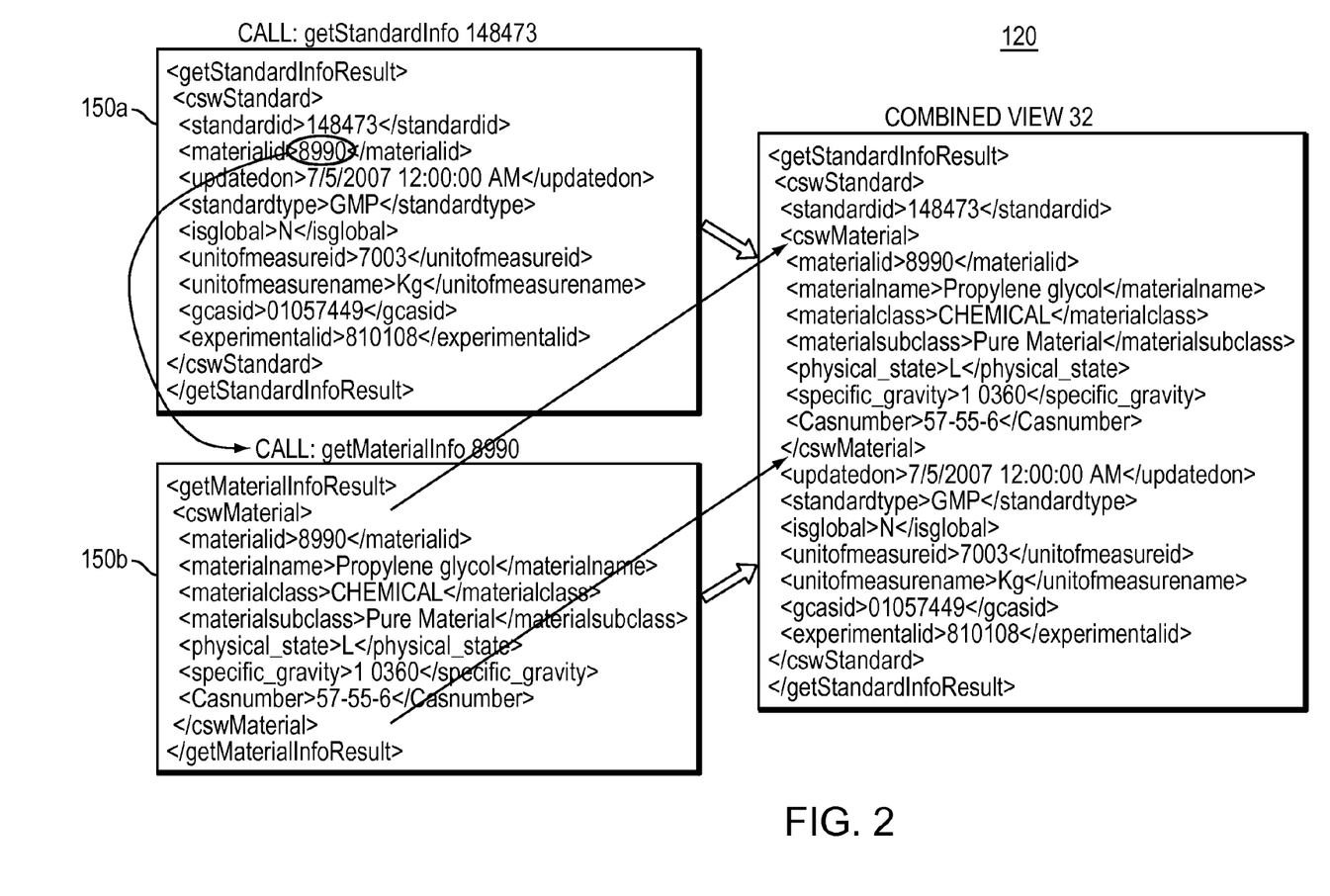
FIG. 2 is a schematic view of an embodiment of the present invention chaining calls to multiple Web (global computer network) services of a target system resulting in a combined view of data from the target system.

As shown in FIG. 2, a Target System 300 exposes separate web services 150a, b for "getStandardInfo" and "getMaterialInfo". Response from "getStandardInfo" service call 150a contains input ("materialid") required for "getMaterialInfo" Web service 150b. The invention Adaplet 120 forms a combined view 32 of these two service calls 150a, 150b by logically appending in series or chaining the calls. The combined view 32 can be viewed as a single logical document.

Figure 3:
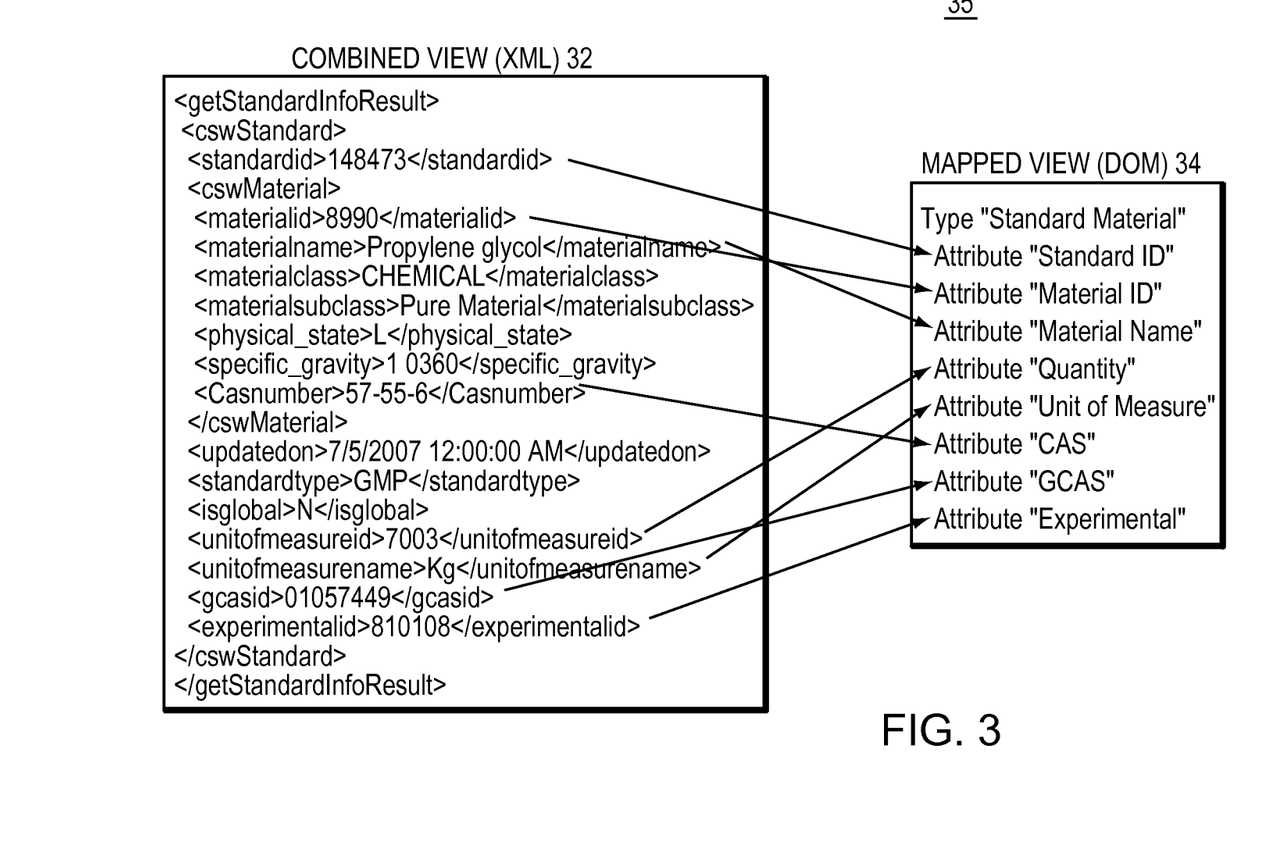
FIG. 3 is a schematic view of the combined view of FIG. 2 being mapped to the Platform schema of FIG. 1 according to principles of the present invention.
Figure 4:
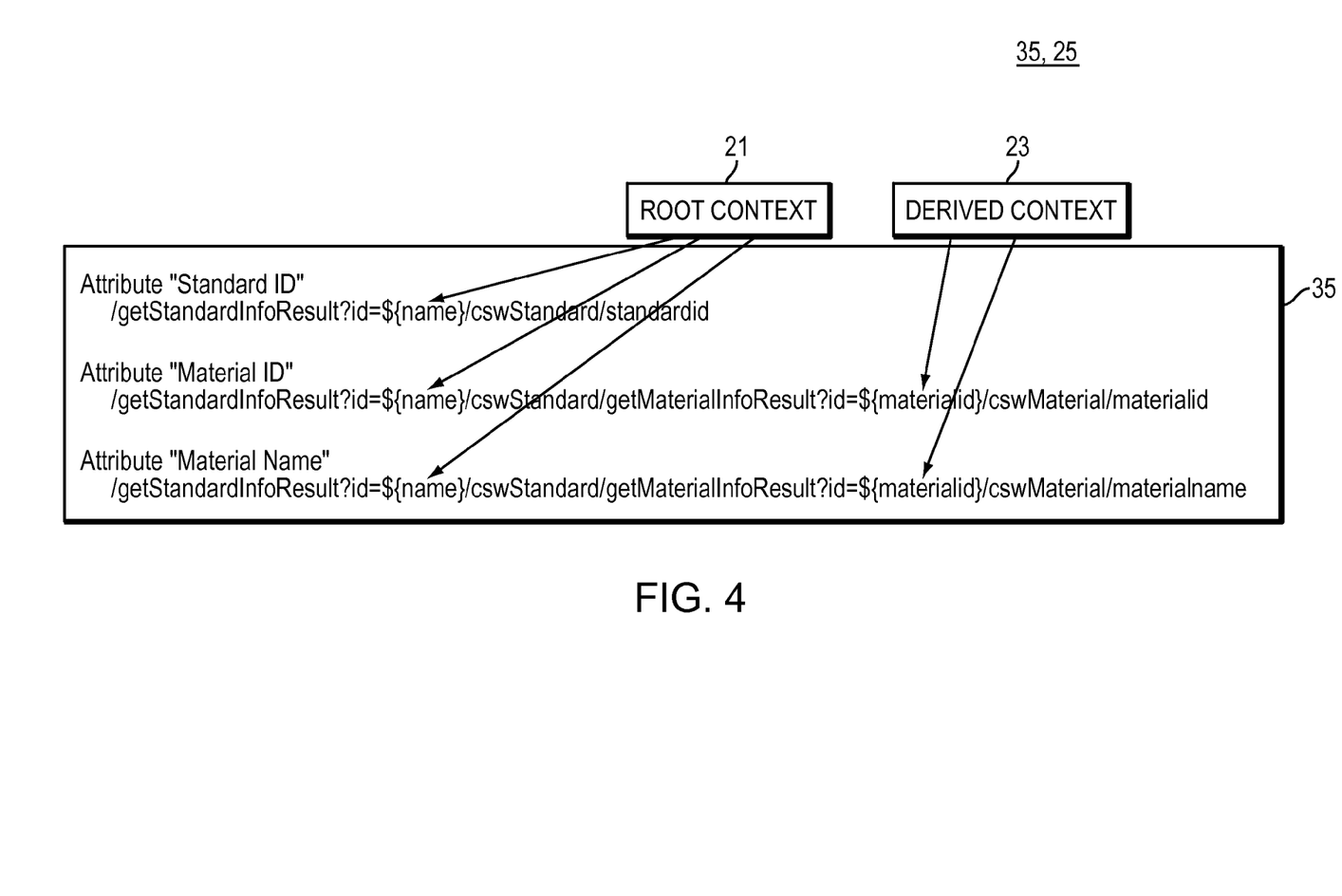
FIG. 4 is a schematic view of the mapping engine of the present invention implementing query/mapping syntax in the example of FIGS. 2 and 3.

From the combined view 32, a mapping engine 35, simplifies mapping to Platform schema 135 (FIG. 3). A mapped view 34 results. This is accomplished as follows. Path language can identify any node of any document (or Service 150) from a single "root". Next the mapping engine 35 implements Query/Mapping syntax 25 as illustrated in FIG. 4.

The mapping 25 shows a simple path where each node may invoke a Service 150. The path definition also makes use of "macro" syntax to pass arguments or parameters in URL-like fashion. The mapping 25 uses pre-defined macro's based on object context such as root context 21 and derived context 23. For example, $(name) as a root context 21 is employed in the illustrated example of FIG. 4.

The mapping 25 also uses dynamic macro's based on document/response message content. This is shown in the illustrated example as derived context 23: $(materialid).

Figure 5:
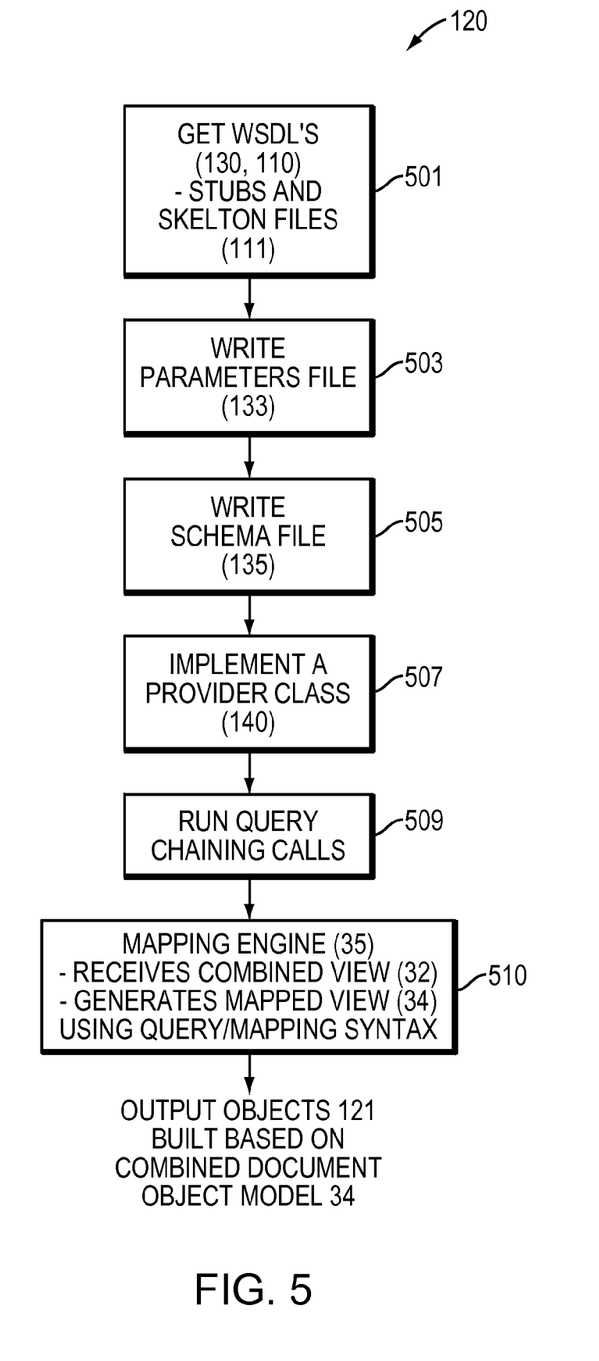
FIG. 5 is a flow diagram of processing and data control in one embodiment of the present invention.

With reference to FIGS. 1C and 5, implementation and operation of invention adaplet 120 in one exemplary, non-limiting embodiment is as follows. Adaplet 120 is implemented as a JAVA component that talks to the Target System database through existing (previously defined/provided) Web services 150 of the Target System 300. As described above in FIG. 1B, Platform 200 is able to support other (plural) computer architectures in addition to JAVA, so implementation of adaplet 120 is not limited to JAVA. Collaboration Platform 200 provides the client side of the Web services 150. The adaplet 120 interface (step 501 of FIG. 5) obtains WSDL files 130 for the Web services 150 exposed by the Target System 300. As before in the case of WSA Adaplets, the handshake between client Platform 200 and Target System 300 is defined by WSDL files 130 and the WSDL files 130 describe the messages that respective Web services 150 understand, the format of the response to those messages, the protocols, that the services supports, etc.

Users use the WSDL files 130 along with the appropriate JAVA tools 110 to generate stubs and skeleton files 111. The stubs and client class are used at runtime by provider class 140 to construct a complex business object as described in schema file 135 (e.g., a Schema.xml). The user does not need to fill the skeleton files 111 with the methods to be implemented by Target System 300 as in the prior WSA Adaplets.

Next the adaplet interface (step 503, FIG. 5) writes a parameters file 133, this is the mechanism for making configuration settings. Step 503 also defines the provider class 140 and the endpoints to web services 150a, b, . . . n that are exposed by the Target System 300. Adaplet 120 interface stores an XML file in the database 123 along with the adaplet vault 125 description. This XML file is parsed and part is used as input to the "Add Vault" command (discussed later) and part is passed into the adaplet provider's init( ) entry point as a schema map.

Step 505 writes the schema file 135. The contents, i.e., the schema map, is returned in response to the init( ) call of the provider through client Platform 200. In one embodiment, the schema mapping file 135 is an XML file. Objects/relationships 121 returned by adaplets 120 must conform to the structure objects/relationships within Collaboration Platform 200. The mapping is the responsibility of the adaplet 120 implementation. The relational adaplet 120 accomplishes this with mapping engine 35 that transforms relational data into business objects.

At step 507, the provider class 140 implements an interface (e.g., ffprovider interface in one embodiment). This is provided by the provider Class 140 using the existing subject web service 150 interface to implement the query interface. In one embodiment, the query/mapping syntax 25 of FIG. 4 is built into provider class 140. However, in other embodiments query/mapping syntax 25 may be external to provider class 140 to navigate relationships and combine results from existing web services 150.

It is noted that the provider class 140 generated interface replaces the prior WSA Adaplet approach and requirements of the user to (i) fill the skeleton file 111 with methods implemented by the Target Systems and to (ii) implement web services/the skeleton class methods in each Target System.

At step 509, the adaplet 120 interface runs the MQL Command:

Add Vault [vaultname] external file [file name]

where [filename] is read from the XML file in parameters file 133 stored in step 503. Thus client Platform 200/adaplet 120 queries for the Target System data for complex business objects by making use of the one or more previously existing/provided web service 150 calls of the Target System 300. In particular, adaplet 120 chains web service calls as described previously in FIG. 2.

In turn, provider class 140 constructs (builds) the subject complex business object 121 following the schema map of schema file 135. In particular, provider class 140 combines results from the called existing web services 150, and mapping engine 35 maps from the Web service calls syntax to Platform 200 schema (as detailed above in FIGS. 3 and 4).

The present invention adaplet 120 is unique in its ability to chain multiple web services 150 response messages and utilize the combined view 32 and mapped view 34 (Document Object Model) to define appropriate and "unique" mappings 25, thereby federating objects 121 from External Systems 300.

Potential Opportunities of Usage:

The present invention adaplet 120 promotes re-use of existing web services 150 without any additional coding/Target System implementation of class methods and can potentially interlink syntax mappings 25 across multiple-domains. The invention adaplet 120 improves upon the existing Web Service Adaplet implementation which requires the Target System 300 to implement Platform 200 defined services.

Another potential application of invention adaplet 120 is to any problem where documents/services 150 have underlying structure, dependencies and require navigation. One example is in Requirements Management integrating RTF (Rich Text Format)/xml fragments into a single assembly. Another example is documents left 'in situ', referenced via dedicated Web service. 80% of enterprise knowledge is sitting in file servers, not relational databases. Accessing documents in place allows users to leverage this information without changing the way people work.

Existing adapters and federation toolkits do a point to point integration of Business Objects. They do not address the need to define mappings between systems for Objects/Data that have relationships/dependencies.

Figure 6:
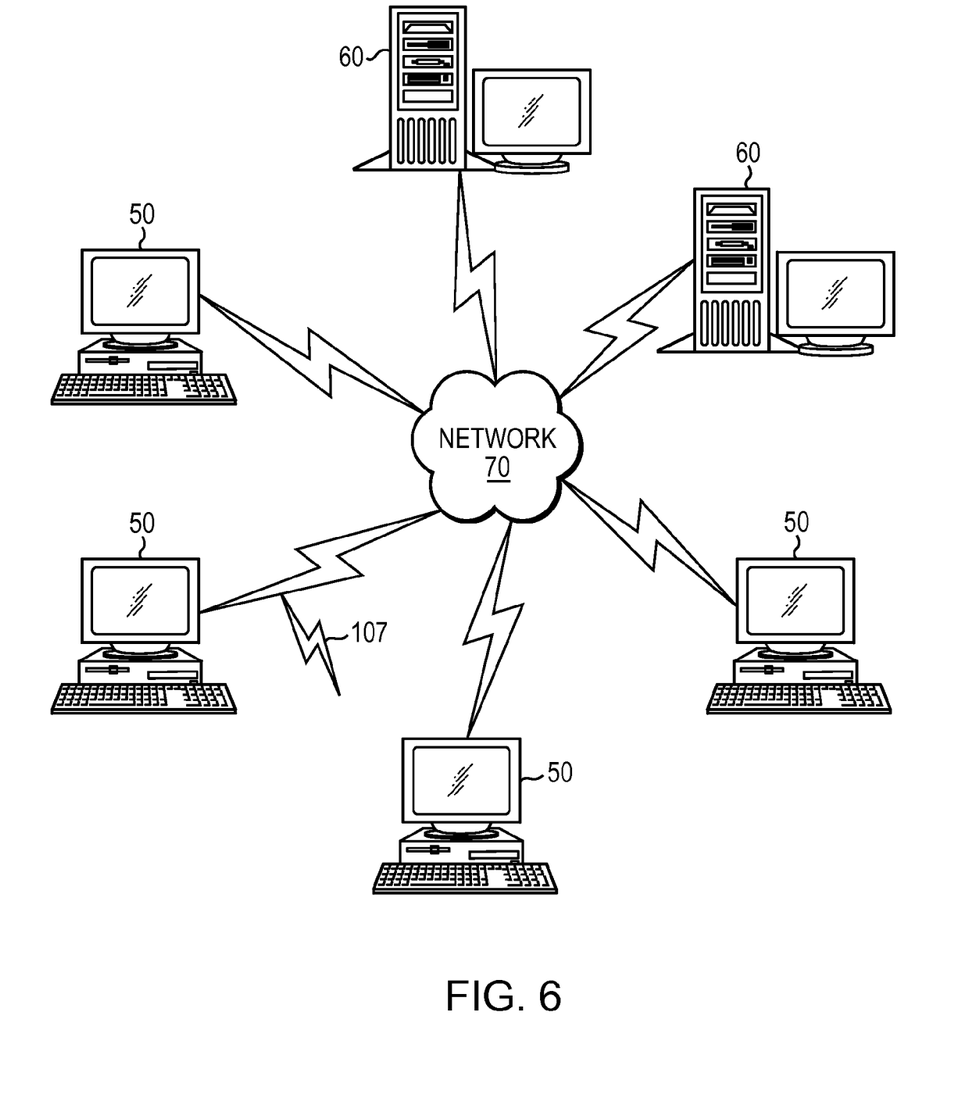
FIGS. 6 and 7 are schematic and block views respectively of a computer network environment in which embodiments of the present invention operate.

FIG. 6 illustrates a computer network or similar digital processing environment in which the present invention may be implemented.

Client computers/devices 50 (such as application executing clients 204) and server computers 60 (such as Web server 238 and application servers 236 of Platform 200) provide processing, storage, and input/output devices executing application programs and the like. Client computers/devices 50 can also be linked through communications network 70 to other computing devices, such as Target Systems 300 implemented as other client devices/processes 50 and server computers 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 7:
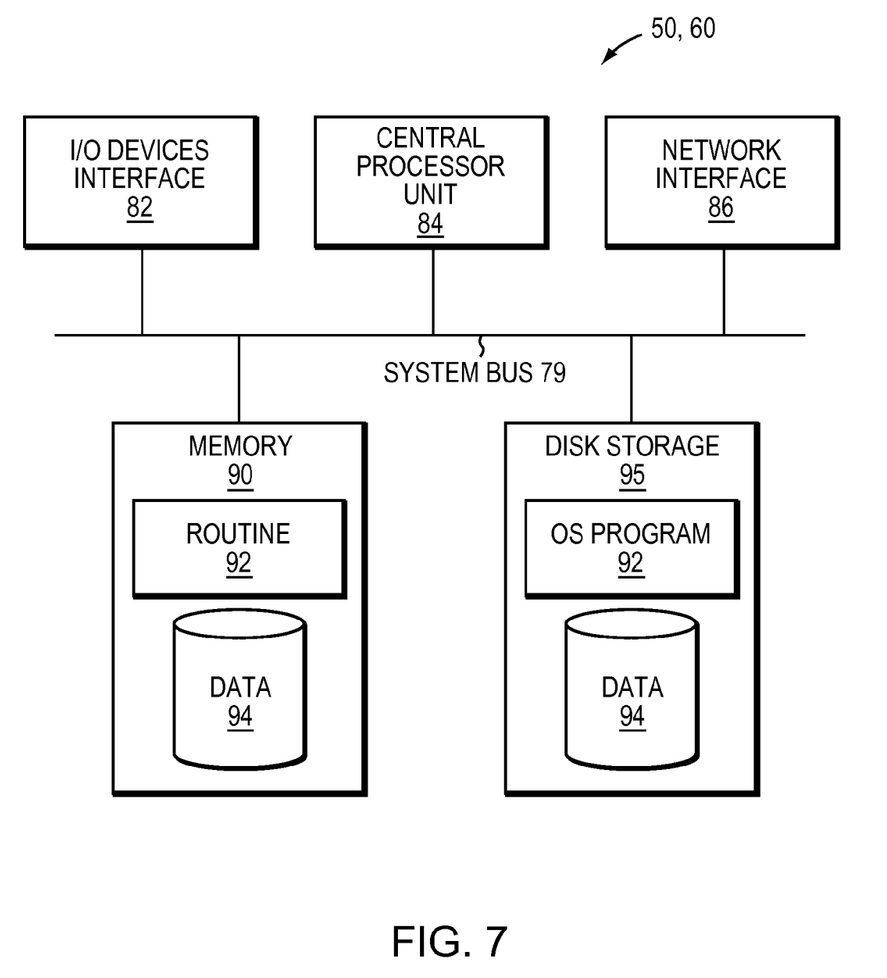

FIG. 7 is a diagram of the internal structure of a computer (e.g., client processor/device 50 or server computers 60) in the computer system of FIG. 6. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 6). Memory 90 provides volatile storage for computer software instructions 92 and data 94 used to implement an embodiment of the present invention (e.g., adaplets 120, mapping engine 35 and supporting query/mapping syntax 25 and other code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented system providing access to network services data of a target system, the computer-implemented system comprising a hardware processor configured to implement:

an application interface configured to interface with the target system, the target system exposing a first and a second data through a plurality of global computer network services, the application interface further configured to define a query of the first exposed data and second exposed data along a federated common data, the application interface of the target system using in common one of the plurality of global computer network services across two or more applications, such that the application interface reuses global computer network services among the two or more applications for the target system; and a mapping member configured to create a map, along the federated common data, between (a) the query of the exposed data by the application interface, and (b) syntax of objects in a subject application, the mapping member enabling the subject application to access object instances generated in response to the defined query;

wherein in implementing the query, the application interface is configured to chain calls to at least two of the global computer network services of the target system to form an object representing a combined view of the first exposed data and second exposed data, in a manner resulting in a presentation of the combined view along the federated common data of the first exposed data and the second exposed data from the target system;

wherein the at least two global computer network services are previously provided by the target system such that the application interface reuses existing assets of the target system.

2. A computer system as claimed in claim 1, wherein the mapping member from the combined view maps query syntax of objects in the subject application.

3. A computer system as claimed in claim 1 wherein the computer system is employed by a collaboration platform, and wherein the target system is an external system to the collaboration platform and configured as a distributed object client.

4. A computer system as claimed in claim 1 wherein the subject application is implemented as any of an extensible mapping language (XML) client, a remote method invocation (RMI) client, an enterprise JAVA Bean (EJB) client and a JAVA Native Interface (JNI) client.

5. A computer implemented method of accessing network services data of a target system, comprising:

interfacing between a subject application and the target system, the target system exposing a first and a second data through a plurality of global computer network services, the interfacing including implementing defining a query of the first exposed data and the second exposed data along a federated common data, the interfacing of the target system using in common one of the plurality of global computer network services across two or more applications, such that global computer network services are reused among the two or more applications for the target system; and creating a map, along the federated common data, between (a) the query of the exposed data and (b) syntax of objects issued by the subject application, the mapping enabling the subject application to access object instances generated in response to the defined query;

wherein in implementing the query, the interfacing chains calls to at least two of the global computer network services of the target system to form an object representing a combined view of the first exposed data and second exposed data, in a manner resulting in a presentation of the combined view along the federated common data of the first exposed data and the second exposed data from the target system;

wherein the at least two global computer network services are previously provided by the target system such that the interfacing reuses existing assets of the target system.

6. A computer method as claimed in claim 5, wherein the mapping includes:

from the combined view, mapping query syntax of objects in the subject application.

7. A computer method as claimed in claim 5 wherein the method is utilized by a collaboration platform, and the target system is an external system to the collaboration platform, and configured as a distributed object client.

8. A computer method as claimed in claim 5 wherein the subject application is implemented as any of an extensible mapping language (XML) client, a remote method invocation (RMI) client, an enterprise JAVA Bean (EJB) client and a JAVA Native Interface (JNI) client.

* * * * *